(No Model.)

J. LOVETT.
COMBINED WASHER AND LINCHPIN.

No. 333,078. Patented Dec. 22, 1885.

Attest:
Cout. A. Cooper.
H. E. Hansmann.

John Lovett,
Inventor:
By Foster & Freeman
Attys

UNITED STATES PATENT OFFICE.

JOHN LOVETT, OF INDIANAPOLIS, INDIANA, ASSIGNOR OF ONE-THIRD TO JOHN PICKERING, OF CINCINNATI, OHIO.

COMBINED WASHER AND LINCHPIN.

SPECIFICATION forming part of Letters Patent No. 333,078, dated December 22, 1885.

Application filed May 13, 1885. Serial No. 165,374. (No model.)

*To all whom it may concern:*

Be it known that I, JOHN LOVETT, a citizen of the United States, residing at Indianapolis, in the county of Marion and State of Indiana, have invented certain new and useful Improvements in Combined Washer and Linchpin for Roller-Skates, of which the following is a specification.

My invention relates to means for securing wheels upon axles and the like, and more particularly for securing the wheels to the axles of roller-skates; and it consists in a combined washer and linchpin adapted to be applied to the ends or journals of the axles to retain the wheels thereon.

Figure 1:
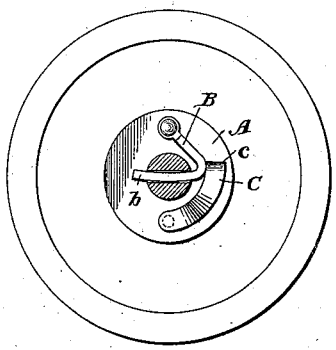
Figure 2:
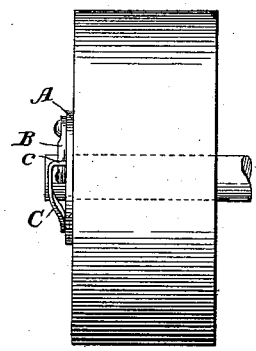
Figure 3:
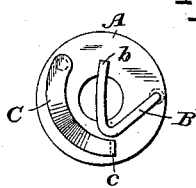

Referring to the accompanying drawings, forming part of this specification, Figure 1 is an end view of a wheel of a roller-skate confined to the axle. Fig. 2 is a side view of the same, and Fig. 3 shows the combined washer and linchpin detached.

In the manufacture and use of roller-skates it is often necessary or desirable to remove the wheels from the axles for inspection, repairs, or replacement; and it is desirable to have some means whereby this may be easily and quickly accomplished. It is also necessary to have such means so constructed that the wheel will be securely held in place without danger of becoming loosened by accident or use, in order to prevent accidents that might otherwise arise.

Many ways of securing the wheels have been used, some of which are quite primitive and unreliable, and others are more complex and expensive. I overcome the disadvantages of these, and at the same time furnish a cheap and effective lock for the wheel, and one that can be readily removed and that is not liable to become loosened or disengaged by use or accident. I take the ordinary metal or other washer, A, and near the periphery secure a bent wire, rod, or bar, B, by means of a pin or by upsetting the end, so as to form a pivot. This wire or bar is bent at an acute angle, so that the free end *b* thereof will readily pass into the opening or drill-hole in the end of the shaft, and extend through, so as to present a bearing upon the opposite side of the washer. By this means I provide a linchpin permanently connected to the washer, having a bearing upon both sides of the shaft.

In order to lock the pin in position, a curved piece of spring metal, C, is secured at one end to the face of the washer by one or more rivets or otherwise, and the other end is bent or upset, as at *c*, to form a stop for the bent pin. If it is desired to remove the wheel from the shaft, the spring is simply raised a trifle and the bent bar or pin is swung around out of the hole, the shaft being turned a little, if necessary, when the washer and fastening-pin may be removed, and with it the wheel. The wheel can as easily be secured by forcing the pin through the hole and allowing the spring-lip to snap down behind the same.

It will thus be seen that I provide a complete fastening device in itself in the combined washer and linchpin, that it is applicable to many and various forms of skates, and that it always presents the solid smooth surface of the washer in contact with the wheel, thereby preventing any undue wear or liability to accident.

It is evident that the shape of the pin and retaining-spring may be varied from that shown without departing from my invention, and I do not limit myself thereto.

What I claim is—

1. A combined washer and linchpin, consisting of a washer having secured to its face a pivoted linchpin, and a spring-stop arranged to positively lock the pin in place, substantially as described.

2. A combined washer and linchpin, consisting of a washer having an opening, and an approximately-L-shaped pin pivotally secured at one end to the face of the washer to centrally cross said opening, and a spring-stop rigidly secured at one end to the washer, and adapted to engage said pin, substantially as and for the purpose set forth.

3. A combined washer and linchpin, consisting of an annular washer having a central opening, an approximately-L-shaped pin pivotally secured at one end to said washer and centrally crossing said opening at the other end, and a spring-stop rigidly secured at one end to the washer, and having its other end upset to rest against the face of the washer in rear of the pin, substantially as and for the purpose set forth.

In testimony whereof I have signed my name to this specification in the presence of two subscribing witnesses.

JOHN LOVETT.

Witnesses:
F. L. FREEMAN,
A. E. T. HANSMANN.